United States Patent
Ma et al.

(10) Patent No.: US 10,270,938 B2
(45) Date of Patent: Apr. 23, 2019

(54) IMAGE-PROCESSING-BASED TEXT SEPARATION METHOD, TEXT SEPARATION DEVICE, AND IMAGE FORMATION APPARATUS

(71) Applicant: Zhuhai Seine Technology Co. Ltd., Zhuhai (CN)

(72) Inventors: Yangxiao Ma, Zhuhai (CN); Lina Meng, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/694,571

(22) Filed: Sep. 1, 2017

(65) Prior Publication Data

US 2018/0069984 A1    Mar. 8, 2018

(30) Foreign Application Priority Data

Sep. 5, 2016 (CN) .......................... 2016 1 0805468

(51) Int. Cl.
| | |
|---|---|
| G06K 9/32 | (2006.01) |
| G06T 7/11 | (2017.01) |
| G06T 7/13 | (2017.01) |
| G06K 9/00 | (2006.01) |
| H04N 1/00 | (2006.01) |
| H04N 1/40 | (2006.01) |
| H04N 1/409 | (2006.01) |

(52) U.S. Cl.
CPC ..... *H04N 1/40062* (2013.01); *G06K 9/00463* (2013.01); *G06K 9/325* (2013.01); *G06T 7/11* (2017.01); *G06T 7/13* (2017.01); *H04N 1/409* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,379,130 A * | 1/1995 | Wang | ................. | H04N 1/40062 358/3.15 |
| 5,974,197 A * | 10/1999 | Lee | ........................... | G06T 5/20 382/199 |
| 6,178,010 B1 * | 1/2001 | Takenouchi | ....... | G06K 9/00456 358/1.9 |
| 6,608,942 B1 * | 8/2003 | Le | .......................... | G06T 5/002 382/199 |
| 6,631,210 B1 * | 10/2003 | Mutoh | .............. | H04N 1/40062 358/1.9 |

(Continued)

*Primary Examiner* — Scott A Rogers
(74) *Attorney, Agent, or Firm* — Anova Law Group, PLLC

(57) ABSTRACT

A text separation method, a text separation device, and an image formation apparatus are provided. The text separation method includes obtaining a pixel value of each pixel in a to-be-processed image having a plurality of pixels; determining an edge intensity value of each pixel according to pixel values of each pixel and a preset number of pixels adjacent to each pixel; determining a binary map corresponding to the to-be-processed image according to the edge intensity value of each pixel; determining a text region determination value of each pixel according to the binary image and the pixel value of each pixel; and determining text-body regions and non-text-body regions in the to-be-processed image according to the text region determination value of each pixel.

18 Claims, 7 Drawing Sheets

(56) References Cited

U.S. PATENT DOCUMENTS

| | | | |
|---|---|---|---|
| 7,006,255 B2 * | 2/2006 | Sun .................... | H04N 1/4092 358/1.9 |
| 2009/0074291 A1 * | 3/2009 | Iinuma ............... | G06K 9/00456 382/178 |
| 2011/0249305 A1 * | 10/2011 | Okamoto ........... | G03G 15/0115 358/474 |
| 2015/0312442 A1 * | 10/2015 | Higashi ................ | H04N 1/409 382/266 |

* cited by examiner

| (i-1,j+1) | (i,j+1) | (i+1,j+1) |
|---|---|---|
| (i-1,j) | (i,j) | (i+1,j) |
| (i-1,j-1) | (i,j-1) | (i+1,j-1) |

FIG. 3

| a(-1,1) | a(0,1) | a(1,1) |
|---|---|---|
| a(-1,0) | a(0,0) | a(1,0) |
| a(-1,-1) | a(0,-1) | a(1,-1) |

FIG. 4

| b(-1,1) | b(0,1) | b(1,1) |
|---------|--------|--------|
| b(-1,0) | b(0,0) | b(1,0) |
| b(-1,-1)| b(0,-1)| b(1,-1)|

FIG. 5

| 1 | 1 | 1 |
|---|---|---|
| 0 | 0 | 0 |
| -1| -1| -1|

A

| 1 | 0 | 1 |
|---|---|---|
| 0 | 0 | 0 |
| -1| 0 | -1|

IMAGE-PROCESSING-BASED TEXT SEPARATION METHOD, TEXT SEPARATION DEVICE, AND IMAGE FORMATION APPARATUS

CROSS-REFERENCES TO RELATED APPLICATIONS

This application claims priority of Chinese Patent Application No. 201610805468.7, filed on Sep. 5, 2016, the entire contents of which are hereby incorporated by reference.

FIELD OF THE INVENTION

The present disclosure generally relates to the field of image processing technology and, more particularly, relates to an image-processing-based (IPB) text separation method, an IPB text separation device, and an IPB image formation apparatus.

BACKGROUND

When image files are printed in black-and-white, output performances of the image files are not ideal due to a variety of contents in the image files. For example, an image file may contain both text and graphics. Thus, different content elements may have to be processed differently.

In the existing technology, methods for text-graphics separation are adopted to identify different contents. Some methods achieve text-graphics separation by recognizing text edges and making them bold, but the text-contents (i.e. text bodies) are not well recognized, causing hollowed-out text in the text contents. Some other methods, due to the complex recognition process, can slow down the processing speed for text-graphics separation and cause decrease in printing or copying speed.

The disclosed image-processing-based text separation method, image-processing-based text separation device, and image-processing-based image formation apparatus are directed to solve one or more problems set forth above and other problems.

BRIEF SUMMARY OF THE DISCLOSURE

One aspect of the present disclosure provides a text separation method. The text separation method includes obtaining a pixel value of each pixel in a to-be-processed image having a plurality of pixels; determining an edge intensity value of each pixel according to pixel values of each pixel and a preset number of pixels adjacent to each pixel; determining a binary map corresponding to the to-be-processed image according to the edge intensity value of each pixel; determining a text region determination value of each pixel according to the binary image and the pixel value of each pixel; and determining text-body regions and non-text-body regions in the to-be-processed image according to the text region determination value of each pixel.

Another aspect of the present disclosure provides a text separation device. The text separation device includes an acquisition module configured to obtain a pixel value of each pixel in a to-be-processed image having a plurality of pixels; a detection module configured to determine an edge intensity value of each pixel according to pixel values of each pixel and a preset number of pixels adjacent to each pixel; a first graphics-text separation module configured to determine a binary image corresponding to the to-be-processed image according to the edge intensity value of each pixel; a second graphics-text separation module configured to determine a text region determination value of each pixel according to the binary image and the pixel value of each pixel; and a decision module configured to determine text-body regions and non-text-body regions in the to-be-processed image according to the text region determination value of each pixel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 3 illustrates a schematic view of an exemplary 3×3 processing window of a target pixel in an exemplary IPB text separation method consistent with disclosed embodiments;

FIG. 4 illustrates a schematic view of an exemplary first detection filter for an exemplary IPB text separation method consistent with disclosed embodiments;

FIG. 5 illustrates a schematic view of an exemplary second detection filter for an exemplary IPB text separation method consistent with disclosed embodiments;

FIG. 6 illustrates two exemplary sets of values for an exemplary first detection filter in an exemplary IPB text separation method consistent with disclosed embodiments;

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

Figure 1:
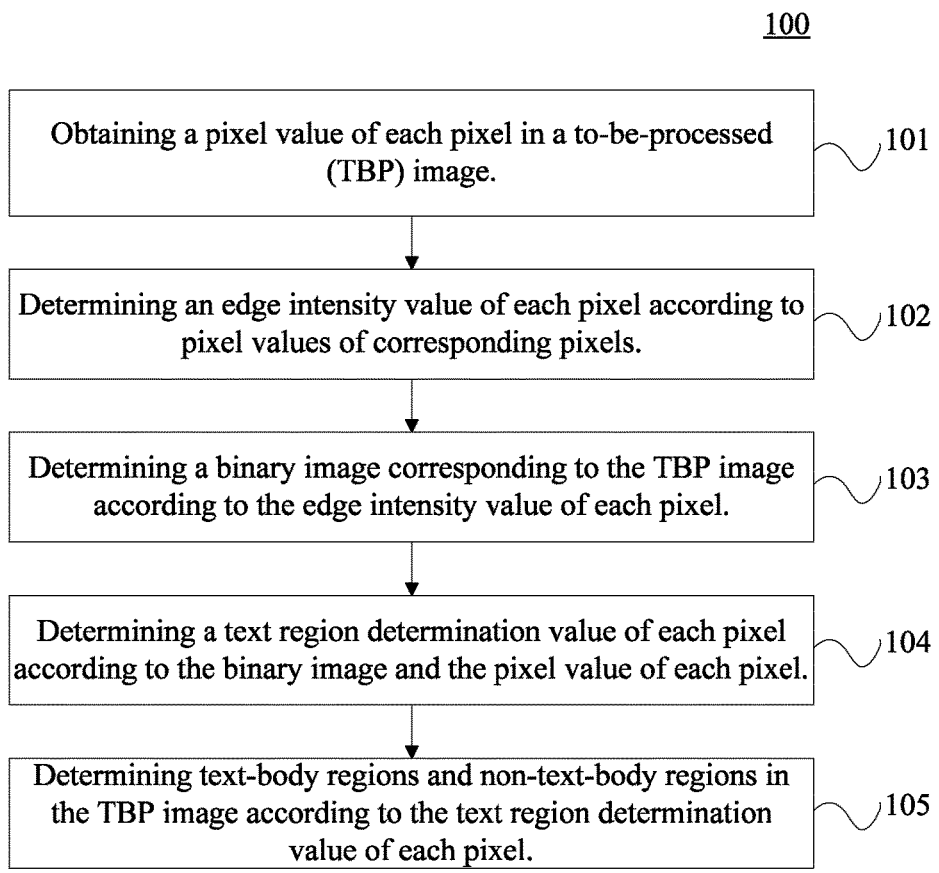
FIG. 1 illustrates a flow chart of an exemplary image-processing-based (IPB) text separation method consistent with disclosed embodiments.

FIG. 1 illustrates a flow chart of an exemplary image-processing-based (IPB) text separation method 100 consistent with disclosed embodiments. With reference to FIG. 1, the exemplary IPB text separation method 100 is described below.

Step 101, obtaining a pixel value of each pixel in a to-be-processed (TBP) image.

In various embodiments, the IPB text separation method may be executed by a computer, a processor in a computer, or any appropriate device capable of executing the disclosed method. After the TBP image is inputted to a corresponding device, pixel values of pixels in the image are obtained. $P(i,j)$ represents a pixel value of a target pixel $(i,j)$ in the TBP image, where $i \in [1,M]$, $j \in [1, N]$, i, j, M, and N are positive integers, M is a width of the TBP image, and N is a height of the TBP image.

Step 102, determining an edge intensity value of each pixel according to pixel values of corresponding pixels.

In some embodiments, for determining the edge intensity value of each pixel, the corresponding pixels may include, for example, each pixel and a preset number of pixels adjacent to each pixel. In various embodiments, edge intensity values of pixels may be calculated by using gradient operators according to pixel values of corresponding pixels. In certain embodiments, a gradient operator may include a Laplace operator. In other embodiments, a gradient operator may include a Sobel operator.

Step 103, determining a binary image corresponding to the TBP image according to the edge intensity value of each pixel.

In various embodiments, the binary image corresponding to the TBP image may be determined corresponding to an edge intensity value of each pixel in the TBP image. Each pixel in the binary image may have a value that is either 255 or 0.

Step 104, determining a text region determination value of each pixel according to the binary image and the pixel value of each pixel.

In various embodiments, a text region determination value of each pixel can be calculated according to a value of each pixel in the binary image and a pixel value of each pixel. Each pixel may have one respective text region decision value.

Step 105, determining text-body regions and non-text-body regions in the TBP image according to the text region determination value of each pixel.

In various embodiments, whether each pixel is a text-body region or a non-text-body region can be determined, by judging each pixel according to the text region determination value of each pixel. After the judging of each pixel, text-body regions and non-text-body regions in the TBP image can be determined. Herein, "text-body" may refer to the body of text which does not include a text edge, and a text-body region may refer to a region corresponding to text-body instead of graphics and not including a region for a text edge.

After the text-body regions and non-text-body regions in the TBP image are determined, the text-body regions in the TBP image and the non-text-body regions in the TBP image may be processed separately, thereby enhancing the respective regions.

In various embodiments, Steps 101 to 105 can be implemented by, for example, two implementation methods.

In a first implementation method, each pixel in the TBP image may be processed as following until the binary image corresponding to the TBP image is determined. A pixel value of a current pixel is obtained for each pixel in the TBP image; an edge intensity value of the current pixel is determined according to pixel values of corresponding pixels; and a corresponding value for the current pixel in the binary image corresponding to the TBP image is determined according to the edge intensity value of the current pixel. In some embodiments, for determining the edge intensity value of the current pixel, the corresponding pixels may include, for example, the current pixel and a preset number of pixels adjacent to the current pixel.

After the complete binary image is obtained, a text region determination value may be determined for each pixel. Whether a pixel is a text-body region or a non-text-body region may be determined for each pixel according to the text region decision value of the pixel.

In a second implementation method, a first-part segmentation process and a second-part segmentation process may be repeated until all text-body regions and all non-text-body regions in the TBP image are determined. The first-part segmentation process may include repeating the following process until all corresponding values for a preset quantity of pixels in the binary image are determined. The process may include: obtaining pixel values of the preset quantity of pixels in the TBP image; for each of the preset quantity of pixels, determining an edge intensity value of a current pixel according to pixel values of the corresponding pixels; for each of the preset quantity of pixels, determining a corresponding value for the current pixel in the binary image corresponding to the TBP image, according to the edge intensity value of the current pixel. The second-part segmentation process may include repeating the following process until it is determined that each of the preset quantity of pixels is a text-body region or a non-text-body region. The process may include: for each of the preset quantity of pixels, determining a text region determination value of the current pixel, according to corresponding values for pixels adjacent to the current pixel in the binary image and a pixel value of the current pixel; and for each of the preset quantity of pixels, determining that the current pixel is a text-body region or a non-text-body region, according to the text region determination value of the current pixel.

In some embodiments, Steps 101-105 may be implemented, for example, by performing the first-part segmentation process of Steps 101-103 for all the pixels in the TBP image and determining the entire binary image and, then by performing the second-part segmentation process of Steps 104-105 for all the pixels in the TBP image.

In some other embodiments, Steps 101-105 may be implemented, for example, by performing the first-part segmentation process and the second-part segmentation process of Steps 101-105 to a preset quantity of pixels, then to another preset quantity of pixels, and by repeatedly performing the first-part segmentation process and the second-part segmentation process of Steps 101-105 to another preset quantity of pixels until all the pixels in the TBP image are processed. The implementation may include: performing the first-part segmentation process on a preset quantity of pixels, such that the first-part segmentation process of Steps 101-103 is performed on the preset quantity of pixels, and corresponding values for the preset quantity of pixels in the binary image are determined; then performing the second-part segmentation process on the preset quantity of pixels, such that the second-part segmentation process of Steps 104-105 is performed on the preset quantity of pixels, and it is determined that each pixel in the preset quantity of pixels is a text-body region or a non-text-body region; and, similarly, repeating the first-part segmentation process and the second-part segmentation process, such that it is determined that each of a preset quantity of pixels is a text-body region or a non-text-body region for each time of the repeating, until it is determined that each pixel in the entire TBP image is a text-body region or a non-text-body region.

According to various application scenarios for printing or scanning, the TBP image may be divided into a plurality of bands or blocks. The first-part segmentation process and the second-part segmentation process may be performed on pixels of each band or each block successively, thereby improving a processing speed of the text separation.

In various embodiments, after Step 105, the non-text-body regions and the text-body regions in the TBP image can be distinguished by performing the first-part segmentation process and the second-part segmentation process one or more times. Subsequently, print preprocessing may be performed on the text-body regions in the TBP image and the non-text-body regions in the TBP image. After the print preprocessing, printout contents in black-and-white corresponding to the TBP image can be made clear.

In certain embodiments, the print preprocessing may be applied to the text-body regions in the TBP image by two processing methods.

A first processing method may include: determining whether each pixel corresponds to a text-body region; blackening the current pixel if it is determined that the current pixel is a text-body region; performing no processing if it is determined that the current pixel is a non-text-body region; accordingly, blackening each pixel in text-body regions in the TBP image, such that printout contents in black-and-white corresponding to the text-body regions in the TBP image are clear.

A second processing method may include: determining whether each pixel is a text-body region or a non-text-body region; applying a sharpening process on the current pixel, if it is determined that the current pixel is a text-body region; applying a smoothing process on the current pixel, if it is determined that the current pixel is a non-text-body region; accordingly, applying a sharpening process on each pixel in the text-body regions in the TBP image, such that printout contents for the text-body regions in the TBP image are clear, and applying a smoothing process on each pixel in the non-text-body regions in the TBP image, such that moire fringes can be suppressed in printout contents for the non-text-body regions in the TBP image.

After the print preprocessing, pixel data for each pixel may be integrated together for outputting.

In various embodiments, a pixel value of each pixel in the TBP image may be obtained, and an edge intensity value of each pixel may be determined according to pixel values of corresponding pixels. In some embodiments, for determining the edge intensity value of each pixel, the corresponding pixels may include, for example, each pixel and a preset number of pixels adjacent to each pixel. A binary image corresponding to the TBP image may be determined according to the edge intensity value of each pixel. A text region determination value of each pixel may be determined according to the binary image and the pixel value of each pixel in the TBP image. Text-body regions and non-text-body regions in the TBP image may be determined according to the text region decision value of each pixel. Accordingly, after the determining of the text-body regions and the non-text-body regions in the TBP image, the text-body regions in the TBP image and the non-text-body regions in the TBP image may be processed separately to enhance the respective regions. Further, the text separation method may be adopted during printing image files in black-and-white, such that text-body regions may be identified and enhanced. As a result, blur text regions corresponding to the text-body regions may be prevented during printing or copying in black-and-white, and the clarity may be improved for printing and copying. In addition, for graphics regions in the image file printed in black-and-white, corresponding printout contents in black-and-white may be referred to as halftone graphics regions. The text separation method may be adopted for copying the halftone graphics regions, such that moire fringes previously appearing in a copy of the halftone graphics regions may be suppressed as compared to the existing technology. Accordingly, the clarity for copying may be improved, and a performance for copying may be improved.

The text separation method of the present disclosure may be further applicable to color printing. Accordingly, for the pixel value of each pixel in the TBP image obtained at Step 101, the pixel value may be a gray scale value of the pixel or a value for any one of the three color components of the pixel, or other appropriate value of the pixel. By performing Steps 102-105 after obtaining the pixel values, text-body regions and non-text-body regions in the TBP image may be obtained and enhanced. Accordingly, the clarity of printout contents may be improved for color printouts or black-and-white printouts.

Figure 2:
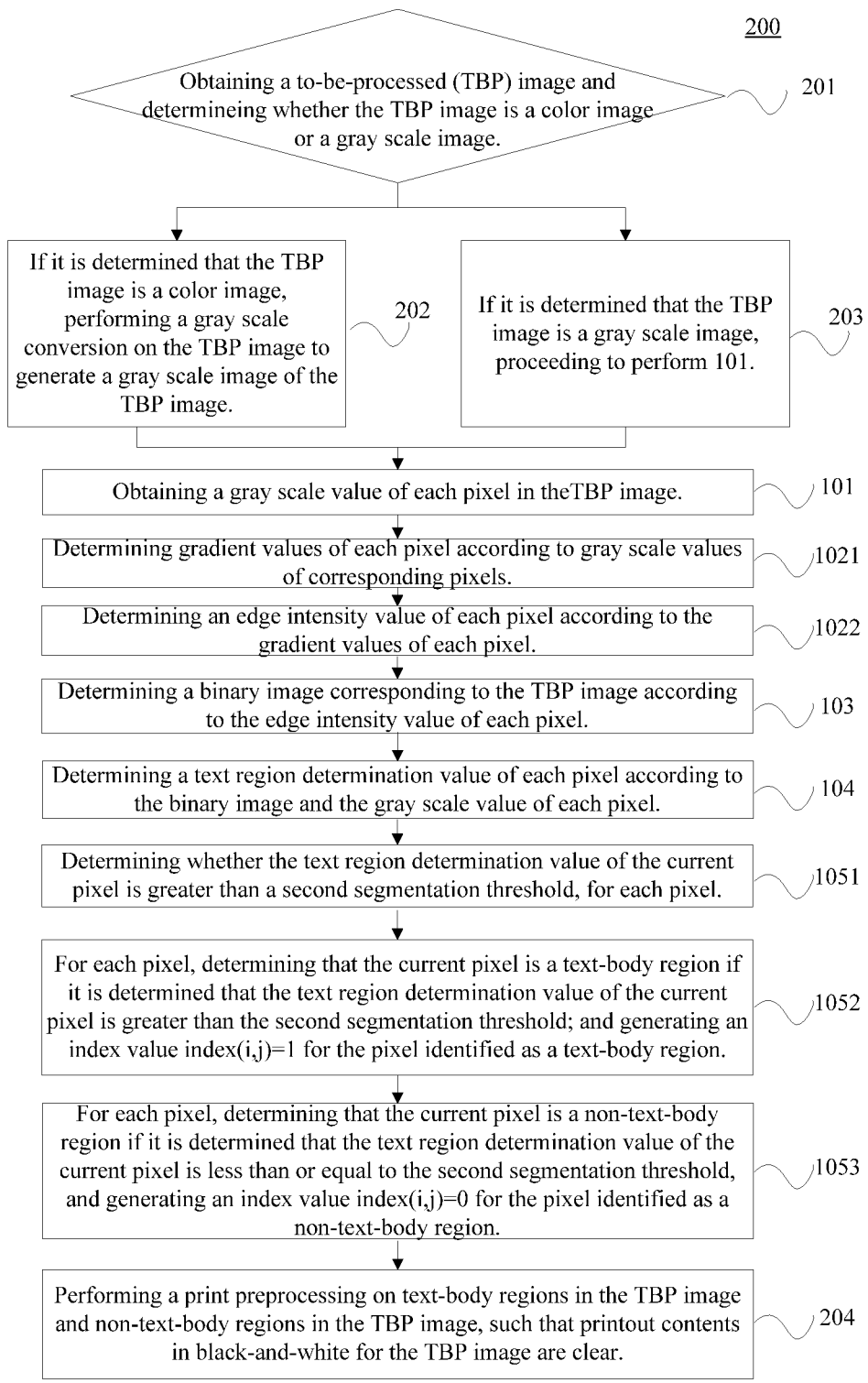
FIG. 2 illustrates a flow chart of another exemplary IPB text separation method consistent with disclosed embodiments.

FIG. 2 illustrates a flow chart of another exemplary IPB text separation method 200 consistent with disclosed embodiments. The same or similar parts of the method 200 and the method 100 are not described again here, while differences between the method 200 and the method 100 are explained. Descriptions are made below for the method 200 with reference to FIG. 2. As shown in FIG. 2, before Step 101, the method 200 further includes Steps 201, 202, and 203.

Step 201, obtaining a TBP image and determine whether the TBP image is a color image or a gray scale image.

An implementation method for Step 201 may include: obtaining the TBP image and testing whether the TBP image has three color channels or has gray scale data; determining that the TBP image is a color image, if it is determined that the TBP image has three color channels; and determining that the TBP image is a gray scale image if it is determined that the TBP image has gray scale data.

In various embodiments, after the TBP image is obtained, a color determination process may be applied on the TBP image to determine whether the TBP image is a color image or a gray scale image.

The TBP image may generally include a plurality of pixels having a pixel as a basic unit. For a color TBP image, each pixel in the color TBP image may be represented by encoding red (R)-green (G)-blue (B) three color components, and may be represented as an array (R(i,j), G (i,j), B (i,j)), where i and j are coordinate values of the pixel. For example, each color component of a pixel may be represented by an 8-bit numerical code. Thus, each color component may be represented by one value selected from 256 values. Values of the three color components may represent intensities in the three color components for the pixel, respectively. For example, for a pixel represented as (255, 0,0), the pixel may be red. For a gray scale TBP image, each pixel in the TBP image may be represented by a gray scale, i.e., Gray(i,j).

Accordingly, by testing whether the TBP image has color channels or gray scale data, it may be determined that the TBP image is a color image after three color channels are detected, and it may be determined that the TBP image is a gray scale image after gray scale data are detected.

Step 202, performing a gray scale conversion on the TBP image to generate a gray scale image of the TBP image, if it is determined that the TBP image is a color image.

The implementation method for Step 202 may include: if it is determined that the TBP image is a color image, performing a gray scale conversion on each pixel in the TBP image according to a gray scale conversion formula Gray(i,j)=a*R(i,j)+b*G(i,j)+c*B(i,j), such that a gray scale image is generated for the TBP image.

Gray(i,j) may be a gray scale value of the pixel (i,j), R(i,j) may be a red color component of the pixel (i,j), G(i,j) may be a green color component of the pixel (i,j), and B(i,j) may be a blue color component of the pixel (i,j). Further, a, b, and c may be product factors of the red color component, the green color component, and the blue color component, respectively. i∈[1,M], j∈[1,N], i, j, M, and N may be positive integers, M may represent a width of the TBP image, and N may represent a height of the TBP image.

In various embodiments, by applying the gray scale conversion on the TBP image, values of the three color components of each pixel may be multiplied by a corresponding product factor, respectively, and products may be summed to yield a gray scale value for each pixel. By the gray scale conversion, for each pixel, three color components in the original TBP color image may be turned into one gray scale.

Step 203, proceeding to perform Step 101 at which a gray scale value of each pixel is obtained, if it is determined that the TBP image is a gray scale image.

Step 1021, determining gradient values of each pixel according to gray scale values of corresponding pixels.

In some embodiments, for determining the gradient values of each pixel, the corresponding pixels may include, for example, each pixel and a preset number of pixels adjacent to each pixel. Specifically, in Step 1021, for each pixel, a gradient operator of a first detection filter and a gradient operator of a second detection filter may be applied to corresponding gray scale values for calculation, such that an inter-row gradient value and an inter-column gradient value of each pixel are determined.

The inter-row gradient value for each pixel may be $$\text{Gradient\_a}(i, j) = \sum_{p=-n,q=-n}^{n,n} (a(p, q) * \text{Gray}(i + p, j + q)),$$

and the inter-column gradient value of each pixel may be $$\text{Gradient\_b}(i, j) = \sum_{p=-n,q=-n}^{n,n} (b(p, q) * \text{Gray}(i + p, j + q)),$$

where i∈[1,M], j∈[1, N], and i, j, M, N, and n may be positive integers. M may be a width of the TBP image, and N may be a height of the TBP image. Gray(i+p,j+q) may be a gray scale value for a pixel (i+p,j+q). Further, a(p,q) may be a value of a (2n+1)*(2n+1) template of the gradient operator of the first detection filter, and b(p, q) may be a value of a (2n+1)*(2n+1) template of the gradient operator of the second detection filter. Further, p∈[−n,n], q∈[−n,n], p and q may be integers, and n may be less than N and M.

In various embodiments, two detection filters, i.e., a first detection filter and a second detection filter, may be configured in advance. Each of the two detection filters may include a gradient operator. The inter-row gradient value $$\text{Gradient\_a}(i, j) = \sum_{p=-n,q=-n}^{n,n} (a(p, q) * \text{Gray}(i + p, j + q))$$

for each pixel may be obtained by applying the gradient operator of the first detection filter on gray scale values of corresponding pixels for calculation. The inter-column gradient value $$\text{Gradient\_b}(i, j) = \sum_{p=-n,q=-n}^{n,n} (b(p, q) * \text{Gray}(i + p, j + q))$$

for each pixel may be obtained by applying the gradient operator of the second detection filter on gray scale values of corresponding pixels for calculation. In some embodiments, the corresponding pixels may include, for example, each pixel and a preset number of pixels adjacent to each pixel.

For example, for a 3×3 template corresponding to n=1, FIG. 3 illustrates a schematic view of an exemplary 3×3 processing window of a target pixel in an exemplary IPB text separation method consistent with disclosed embodiments. As shown in FIG. 3, a pixel (i, j) is a target pixel. Pixels adjacent to the target pixel (i,j) is obtained by using the 3×3 template to obtain pixels (i−1,j+1), (i−1,j), (i−1,j−1), (i,j+1), (i,j−1), (i+1,j+1), (i+1,j), and (i+1,j−1) adjacent to the target pixel (i,j). Accordingly, the target pixel and the eight adjacent pixels around the target pixel are obtained.

A first detection filter and a second detection may be determined. FIG. 4 illustrates a schematic view of an exemplary first detection filter for an exemplary IPB text separation method consistent with disclosed embodiments. FIG. 5 illustrates a schematic view of an exemplary second detection filter for an exemplary IPB text separation method consistent with disclosed embodiments.

As shown in FIG. 4, the first exemplary detection filter provides a parameter array [a(−1,1), a(−1,0), a(−1,−1), a(0,1), a(0,0), a(0,−1), a(1,1), a(1,0), a(1,−1)], and each parameter corresponds to a pixel of each position.

As shown in FIG. 5, the second detection filter provides a parameter array [b(−1,1), b(−1,0), b(−1,−1), b(0,1), b(0,0), b(0,−1), b(1,1), b(1,0), b(1,−1)], and each parameter corresponds to a pixel of each position. The gray scale value of each pixel in the 3×3 template may be multiplied by the corresponding parameter of the first detection filter and then summed to yield the inter-row gradient value of the target pixel (i,j), Gradient_a(i,j)=a(−1,1)*Gray(i−1,j+1)+a(0,1)*Gray (i,j+1)+a(1,1)*Gray(i+1,j+1)+a(−1,0)*Gray(i−1,j)+a(0,0)*Gray (i,j)+a(1,0)*Gray (i+1,j)+a(−1,−1)*Gray (i−1,j−1)+a(0,−1)*Gray (i,j−1)+a(1,−1)*Gray (i+1,j−1). The gray scale value of each pixel in the 3×3 template may be multiplied by the corresponding parameter of the second detection filter and then summed to yield the inter-column gradient value of the target pixel (i,j), Gradient_b(i,j)=b(−1,1)*Gray(i−1,j+1)+b(0,1)*Gray (i,j+1)+b(1,1)*Gray (i+1,j+1)+b(−1,0)*Gray(i−1,j)+b(0,0)*Gray(i,j)+b(1,0)*Gray(i+1,j)+b(−1,−1)*Gray(i−1,j−1)+b(0,−1)*Gray (i,j−1)+b (1,−1)*Gray (i+1,j−1).

Figures 7, 8, 9:
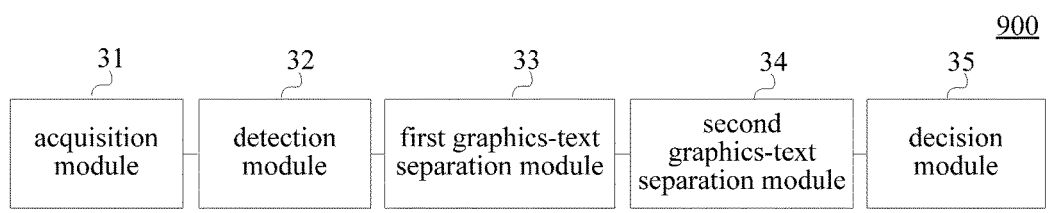
FIG. 7 illustrates two exemplary sets of values for an exemplary second detection filter in an exemplary IPB text separation method consistent with disclosed embodiments.
FIG. 8 illustrates a schematic view of an exemplary region conversion filter of an exemplary IPB text separation method consistent with disclosed embodiments.
FIG. 9 illustrates a schematic view of an exemplary IPB text separation device consistent with disclosed embodiments.

FIG. 6 illustrates two exemplary sets of values for an exemplary first detection filter in an exemplary IPB text separation method consistent with disclosed embodiments. FIG. 7 illustrates two exemplary sets of values for an exemplary second detection filter in an exemplary IPB text separation method consistent with disclosed embodiments. As shown in FIG. 6, a parameter setting of the first detection filter can be any one of the templates A and B in FIG. 6. As shown in FIG. 7 a parameter setting of the second detection filter can be any one of the templates A and B in FIG. 7.

Referring to FIG. 2, Step 1022, determining an edge intensity value of each pixel according to the gradient values of each pixel.

Specifically, in Step 1022, for each pixel, the edge intensity value of each pixel may be determined according to the inter-row gradient value and the inter-column gradient value of the pixel.

The edge intensity value of each pixel may be strength(i,j)=(abs(Gradient_a(i,j))+abs(Gradient_b(i, j)))/2, where Gradient_a(i,j) may be the inter-row gradient value of the pixel, Gradient_b(i,j) may be the inter-column gradient value of the pixel, and abs may represent an absolute value.

In various embodiments, for each pixel, the edge intensity value strength(i,j) of each pixel may be calculated according to the inter-row gradient value Gradient_a(i,j) and the inter-column gradient value Gradient_b (i,j) of each pixel, by using the formula strength(i, j)=(abs(Gradient_a(i, j))+abs(Gradient_b (i, j)))/2 to calculate the edge intensity value strength(i,j) of the pixel.

Steps 1021-1022 in FIG. 2 may be detailed procedures of Step 102 in FIG. 1. Step 103 may include the following steps.

For each pixel, it is determined whether the edge intensity value of the current pixel is greater than a first segmentation threshold; for each pixel, if the edge intensity value of the current pixel is greater than the first segmentation threshold, it is determined that the current pixel is a text-edge region and determine that a value of the current pixel in the binary image is bw(i,j)=255; and for each pixel, if the edge intensity value of the current pixel is less than or equal to the first segmentation threshold, it is determined that the current pixel is a non-text-edge region and it is determined that the value of the current pixel in the binary graph is bw(i, j)=0.

In various embodiments, for generating a binary image corresponding to the TBP image, a first segmentation threshold 'threshold1' is set first. Further, for each pixel, it is determined whether the edge intensity value strength(i,j) of each pixel is greater than the first segmentation threshold threshold1. Further, it is determined whether each pixel corresponds to a text-edge region or a non-text-edge region, and the value bw(i,j) of the pixel in the binary image is generated.

In some embodiments, for each pixel, if an edge intensity value of a current pixel is greater than the first segmentation threshold, i.e., strength(i,j)>threshold1, it may be determined that the current pixel is a text-edge region and that the value of the current pixel in the binary image is bw(i,j)=255. For each pixel, if the edge intensity value of the current pixel is less than or equal to the first segmentation threshold, i.e., strength(i,j)<=threshold), it may be determined that the current pixel is a non-text-edge region and the value of the current pixel in the binary image is bw(i,j)=0. The first segmentation threshold threshold1 may be in a range of [0, $2^f-1$], where f may be related to the number of bits for each pixel. For example, if each pixel of the image corresponds to 8-bit data, the range may be [0, 255]. Generally, the first segmentation threshold threshold1 may be 64.

Step 104 may include determining a text region determination value of the current pixel according to the gray scale value of the current pixel and corresponding values in the binary image for a preset quantity of pixels adjacent to the current pixel, for each pixel.

The text region determination value may be $$\text{Region}(i, j) = \left( \sum_{r=-n, t=-n}^{n,n} bw(i+r, j+t) \right) - bw(i, j) - ((2*n+1)^2 - 1)*\text{Gray}(i, j).$$

Gray(i,j) may be the gray scale value of the pixel (i,j), i∈[1,M], j∈[1, N], i, j, M, N, and n may be positive integers. M may be a width of the TBP image, N may be a height of the TBP image. Further, bw(i+r,j+t) may be a corresponding value in the binary image for a pixel adjacent to the pixel (i, j) in the (2n+1)*(2n+1) template. Further, r∈[-n,n], t∈[-n, n], r and t may be integers, and n may be less than N and M.

The present disclosure provides a region conversion filter including a (2n+1)*(2n+1) template. For each pixel, according to the gray scale value Gray (i, j) of the current pixel (i,j), corresponding values bw(i+r,j+t) in the binary image for a preset quantity of pixels adjacent to the current pixel (i, j), and parameter values in the (2n+1)*(2n+1) template of the region conversion filter, a text region determination value of the current pixel may be determined by a formula $$\text{Region}(i, j) = \left( \sum_{r=-n, t=-n}^{n,n} bw(i+r, j+t) \right) - bw(i, j) - ((2*n+1)^2 - 1)*\text{Gray}(i, j).$$

As an example, the region conversion filter may provide a 3*3 template. FIG. 8 illustrates a schematic view of an exemplary region conversion filter of an exemplary IPB text separation method consistent with disclosed embodiments.

As shown in FIG. 8, the region conversion filter provides a parameter array. Parameters in the parameter array correspond to a target pixel and 8 pixels adjacent to the target pixel. Accordingly, a gray scale value of the target pixel and corresponding values in the binary image for the 8 pixels adjacent to the target pixel may be multiplied with the parameters in FIG. 8, respectively. Resulting products may be summed to yield a text region determination value of the target pixel, i.e., Region(i,j)=bw(i−1,j+1)+bw(i,j+1)+bw(i+1,j+1)+bw(i−1,j)−8*Gray(i,j)+bw (i+1,j)+bw (i−1,j−1)+bw (i,j−1)+bw (i+1,j−1), where bw(i−1,j+1), bw (i,j+1), bw(i+1,j+1), bw(i−1,j), bw(i+1,j), bw (i−1,j−1), bw(i,j−1), and bw (i+1,j−1) may be corresponding values in the binary image for the pixels adjacent to the pixel (i,j) in the 3*3 template.

Referring to FIG. 2, at Step 1051, for each pixel, it is determined whether the text region determination value of the current pixel is greater than a second segmentation threshold.

In various embodiments, for determining text-body regions and non-text-body regions in the TBP image according to the text region determination value of each pixel, a second segmentation threshold 'threshold2' may be preset first. Then, the text region determination value Region(i,j) of each pixel may be compared with the second segmentation threshold threshold2, to determine whether the text region determination value Region(i,j) of the current pixel is greater than the second segmentation threshold threshold2.

The second segmentation threshold threshold2 may be in a range of [0, $2^f-1$], where f may be related to the number of bits for each pixel. For example, if each pixel of the image corresponds to 8-bit data, the range may be [0, 255]. Generally, the second segmentation threshold threshold2 may be 80.

At Step 1052, for each pixel, it is determined that the current pixel is a text-body region if it is determined that the text region determination value of the current pixel is greater than the second segmentation threshold; and an index value index(i,j)=1 is generated for the pixel identified as a text-body region.

In various embodiments, for each pixel, if it is determined that the text region determination value Region (i,j) of the current pixel is greater than the second segmentation threshold threshold2, i.e., Region(i,j)>threshold2, it may be determined that the current pixel is a text-body region, and an index value index(i,j)=1 may be generated for the current pixel identified as a text-body region.

At Step 1053, for each pixel, it is determined that the current pixel is a non-text-body region if it is determined that the text region determination value of the current pixel is less than or equal to the second segmentation threshold, and an index value index(i,j)=0 is generated for the pixel identified as a non-text-body region.

In various embodiments, for each pixel, if it is determined that the text region determination value Region (i, j) of the current pixel is less than or equal to the second segmentation threshold threshold2, i.e., Region (i,j)<=threshold2, it may be determined that the current pixel is a non-text-body region, and an index value index (i,j)=0 may be generated for the current pixel identified as a non-text-body region.

Accordingly, after the text region determination value Region (i,j) of each pixel is compared with the second segmentation threshold threshold2, whether each pixel is a text-body region or a non-text-body region may be distinguished, and a corresponding index value index(i,j) may be generated. After completing the segmentation, it may be determined that non-text-body regions include text-edge regions and graphics regions.

Steps 1051, 1052, and 1053 in FIG. 2 may be detailed procedures of Step 105 in FIG. 1.

The method as shown in FIG. 2 may further include Step 204, after Step 105.

Step 204, performing a print preprocessing on text-body regions in the TBP image and non-text-body regions in the TBP image, such that printout contents in black-and-white for the TBP image are clear.

The print preprocessing on the text-body regions and non-text-body regions in the TBP image may include: blackening each pixel in the text-body regions in the TBP image, such that printout contents in black-and-white corresponding to the text-body regions in the TBP image are clear, or applying a sharpening process on each pixel in the text-body regions in the TBP image, such that printout contents in black-and-white corresponding to the text-body regions in the TBP image are clear; and applying a smoothing process on each pixel in the non-text-body regions in the TBP image, such that moire fringes can be suppressed in printout contents in black-and-white corresponding to the non-text-body regions in the TBP image.

In various embodiments, the print preprocessing may be applied to the text-body regions in the TBP image by, for example, two processing methods.

A first processing method may include: determining whether each pixel is a text-body region according to an index value (i,j) of each pixel; determining that the current pixel is a text-body region if the index value index(i,j) of the current pixel is equal to 1, and blackening the current pixel; determining that the current pixel is a non-text-body region and performing no processing if the index value index(i,j) of the current pixel is equal to 0; and accordingly, blackening each pixel in the text-body regions in the TBP image, such that printout contents in black-and-white corresponding to the text-body regions in the TBP image are clear.

A second processing method may include: determining whether each pixel is a text-body region or a non-text-body region according to the index value index(i,j) of each pixel; determining that the current pixel is a text-body region if the index value index(i,j) of the current pixel is equal to 1, and applying a sharpening process on the current pixel; determining that the current pixel is a non-text-body region if the index value index(i,j) of the current pixel is equal to 0, and applying a smoothing process on the current pixel; and accordingly, applying a sharpening process on each pixel in the text-body regions in the TBP image, such that print out contents in black-and-white corresponding to the text-body regions in the TBP image are clear, and applying a smoothing process on each pixel in the non-text-body regions in the TBP image, such that moire fringes can be suppressed in printout contents in black-and-white corresponding to the non-text-body regions in the TBP image.

After the print preprocessing, pixel data for each pixel is integrated together for outputting.

Thus, after the text-body regions and the non-text-body regions in the TBP image are distinguished, different further processing can be applied on pixels of different types of regions. A blackening process may be performed on each pixel in the text-body regions, or a sharpening process may be performed on each pixel in the text-body regions, such that unclear outputted text can be prevented in a black-and-white printout corresponding to the TBP image including color text or text having different intensities. A smoothing process may be performed on each pixel of the non-text-body regions, such that moire fringes can be suppressed in printout contents in black-and-white corresponding to the non-text-body regions in the TBP image.

In various embodiments, whether a TBP image is a color image or a gray scale image may be determined, and a color image may be converted into a gray scale image. A gray scale value of each pixel in the TBP image may be obtained. An edge intensity values of each pixel may be obtained according to gray scale values of corresponding pixels. In some embodiments, the corresponding pixels may include, for example, each pixel and a preset number of pixels adjacent to each pixel. A binary image corresponding to the TBP image may be determined according to the edge intensity value of each pixel. A text region determination value of each pixel may be obtained according to the binary image and the gray scale value of each pixel. Text-body regions and non-text-body regions in the TBP image may be determined according to the text region determination value of each pixel. A print preprocessing may be performed on the text-body regions in the TBP image and the non-text-body regions in the TBP image, such that printout contents in black-and-white for the TBP image may be clear.

Accordingly, the text-body regions in the TBP image and the non-text-body regions in the TBP image may be processed separately to enhance the respective regions. A blackening process, or sharpening may be performed on each pixel in the text-body regions, such that text-body regions may be effectively recognized when the image file is printed in black-and-white. Accordingly, blur outputs may be prevented during printing or copying in black-and-white for text-body regions including gray scale text-body regions and color text-body regions, and the clarity may be improved for printing and copying. Further, a smoothing process may be performed on each pixel of the non-text-body regions, such that moire fringes can be suppressed in copied contents corresponding to the non-text-body regions, and the clarity and a performance of copying can be improved, as compared to the conventional technology.

In addition, the text separation method of the disclosure may be further applicable to a color printing. In this case, when the TBP image is obtained and it is determined that the TBP image is a color image at Step 201, three color components of the color image may be obtained and processed according to Steps 101-105 separately, without having to convert the TBP image into a gray scale image. Accordingly, text-body regions and non-text-body regions in the color image may be determined. Then, the text-body regions may be applied with a sharpening process, and the non-text-body regions may be applied with a smoothing process, such that a content clarity of a color printout for the color image can be improved.

In various embodiments, during a color printing, at Step 101, a pixel value P(i,j) of each pixel may be obtained, where P(i,j) may be any one selected from three color components R(i,j), G(i,j), and B(i,j).

At Step 1021, gradient values of each pixel are determined according to pixel values of corresponding pixels. In some embodiments, the corresponding pixels may include, for example, each pixel and a preset number of pixels adjacent to each pixel. In various embodiments, a gradient operator of a first detection filter and a gradient operator of a second detection filter may be applied to pixel values of corresponding pixels for calculation, such that an inter-row gradient value and an inter-column gradient value of each pixel may be determined.

The inter-row gradient value for each pixel may be $$\text{Gradient\_a}(i, j) = \sum_{p=-n,q=-n}^{n,n} (a(p, q) * P(i + p, j + q)),$$

and the inter-column gradient value for each pixel may be $$\text{Gradient\_b}(i, j) = \sum_{p=-n,q=-n}^{n,n} (b(p, q) * P(i + p, j + q)),$$

where $i \in [1, M]$, $j \in [1, N]$, and i, j, M, N, and n may be positive integers. M may be a width of the TBP image, N may be a height of the TBP image, P(i+p,j+q) may be a pixel value of a pixel (i+p,j+q), a(p,q) may be a value of a (2n+1)*(2n+1) template of the gradient operator of the first detection filter, b(p,q) may be a value of a (2n+1)*(2n+1) template of the gradient operator of the second detection filter. Further, $p \in [-n,n]$, $q \in [-n,n]$, p and q may be integers, and n may be less than N and M.

At Step 1022, an edge intensity value of each pixel is determined according to the gradient values of each pixel.

Specifically, in step 1022, for each pixel, the edge intensity value of each pixel may be determined according to the inter-row gradient value and the inter-column gradient value of each pixel.

The edge intensity value of each pixel may be strength(i,j)=(abs(Gradient_a(i, j))+abs(Gradient_b(i, j)))/2, where Gradient_a(i,j) may be the inter-row gradient value of the pixel, Gradient_b(i,j) may be the inter-column gradient value of the pixel, and abs may represent an absolute value.

At Step 103, a binary image corresponding to the TBP image is determined according to the edge intensity value of each pixel, which is the same as or similar to Step 103 for printing in black-and-white. Different first segmentation threshold threshold1 may be preset according to which one of different color components the pixel values correspond to.

At Step 104, a text region determination value of each pixel is determined according to the binary image and the pixel value of each pixel. The text region determination value may be $$\text{Region}(i, j) = \left(\sum_{r=-n,t=-n}^{n,n} bw(i+r, j+t)\right) - bw(i, j) - ((2*n+1)^2 - 1) * P(i, j).$$

At Step 105, text-body regions and non-text-body regions in the TBP image are determined according to the text region determination value of each pixel. In various embodiments, a second segmentation threshold threshold2 may be preset. The text region determination value Region(i,j) of each pixel may be compared with the second segmentation threshold threshold2, to determine whether the text region determination value Region(i,j) of the current pixel is greater than the second segmentation threshold threshold2. If the text region determination value Region(i,j) of the current pixel is greater than the second segmentation threshold threshold2, it may be determined that the current pixel is a text-body region. If the text region determination value Region(i,j) of the current pixel is less than or equal to the second segmentation threshold threshold2, it may be determined that the current pixel is a non-text-body region. During color printing, three different second segmentation thresholds threshold2 may have to be preset according to the three color components.

After text-body regions and non-text-body regions in the color image are determined, the text-body regions may be enhanced, or sharpened, and the non-text-body regions may be smoothed, such that the clarity of color printout contents corresponding to a color image may be improved.

The text separation method of the disclosure can be applicable to a black-and-white printing or a color printing. Accordingly, at Step 101, the obtained pixel value P(i,j) can be any one from R(i,j), G(i,j), B(i,j), and Gray(i, j).

FIG. 9 illustrates a schematic view of an exemplary IPB text separation device 900 consistent with disclosed embodiments. As shown in FIG. 9, the exemplary IPB text separation device 900 includes an acquisition module 31, a detection module 32, a first graphics-text separation module 33, a second graphics-text separation module 34, and a decision module 35.

The acquisition module 31 may be configured to obtain a pixel value of each pixel in the TBP image. The detection module 32 may be configured to determine an edge intensity value of each pixel according to pixel values of corresponding pixels. In some embodiments, the corresponding pixels may include, for example, each pixel and a preset number of pixels adjacent to each pixel. The first graphics-text separation module 33 may be configured to determine a binary image corresponding to the TBP image according to the edge intensity value of each pixel. The second graphics-text separation module 34 may be configured to determine a text region determination value of each pixel according to the binary image and the pixel value of each pixel. The decision module 35 may be configured to determine text-body regions and non-text-body regions in the TBP image according to the text region determination value of each pixel.

The disclosed IPB text separation device can perform the IPB text separation method of the disclosure, such as the IPB text separation method 100 in FIG. 1. The same or similar implementation principles are not described again here. The acquisition module 31, the detection module 32, the first graphics-text separation module 33, the second graphics-text separation module 34, and the decision module 35 may be further configured to repeat the following first-part segmentation process and second-part segmentation process until all text-body regions and non-text-body regions in the TBP image are determined.

The first-part segmentation process may include repeating the following process until corresponding values in the binary image for a preset quantity of pixels are determined. The process is described below. The acquisition module 31 obtains pixel values of the preset quantity of pixels in the TBP image; for each of the preset quantity of pixels, the detection module 32 determines an edge intensity value of the current pixel according to pixel values of corresponding pixels; and for each pixel in the preset quantity of pixels, the first graphics-text separation module 33 determines a value of the current pixel in the binary image corresponding to the TBP image according to the edge intensity value of the current pixel. In some embodiments, for determining the edge intensity value of the current pixel, the corresponding pixels may include, for example, the current pixel and a preset number of pixels adjacent to the current pixel.

The second-part segmentation process may include repeating the following process until it is determined that pixels in the preset quantity of pixels are text-body regions or non-text-body regions. The process is described below. For each of the preset quantity of pixels, the second graphics-text separation module 34 determines a text region determination value of the current pixel according to corresponding values in the binary image for pixels adjacent to the current pixel and a pixel value of the current pixel; and, for each of the preset quantity of pixels, the decision module 35 determines that the current pixel is a text-body region or a non-text-body region according to the text region determination value of the current pixel.

The first-part segmentation process and the second-part segmentation process applied on a preset quantity of pixels may be repeated, thereby improving a processing speed of the text separation device.

The disclosed text separation device may obtain a pixel value of each pixel in the TBP image, determine an edge intensity value of each pixel according to pixel values of corresponding pixels, determine a binary image corresponding to the TBP image according to the edge intensity value of each pixel, determine a text region determination value of each pixel according to the binary image and the pixel value of each pixel, and determine text-body regions and non-text-body regions in the TBP image according to the text region determination value of each pixel.

Accordingly, after the determining of the text-body regions and the non-text-body regions in the TBP image, the text-body regions in the TBP image and the non-text-body regions in the TBP image may be processed separately to enhance the respective regions. Further, the text separation device may be adopted during printing image files in black-and-white, such that text-body regions may be identified and enhanced. As a result, blur text regions may be prevented during printing or copying in black-and-white, and the clarity may be improved for printing and copying. In addition, for graphics regions in an image file printed in black-and-white, printout contents in black-and-white corresponding to the graphics regions in the TBP image may be referred to as halftone graphics regions. Further, the text separation device may be adopted in the copying of the halftone graphics regions, such that moire fringes may be suppressed as compared to the conventional technology. Accordingly, the clarity for copying may be improved, and a performance for copying may be improved.

The text separation device of the present disclosure may be further applicable to processing a color image. Accordingly, the acquisition module 31 may be configured to obtain a pixel value of each pixel in a TBP image; and the pixel value may be a gray scale value of a pixel for a black-and-white printing, or may be any one of three color components of a pixel for a color printing.

Figure 10:
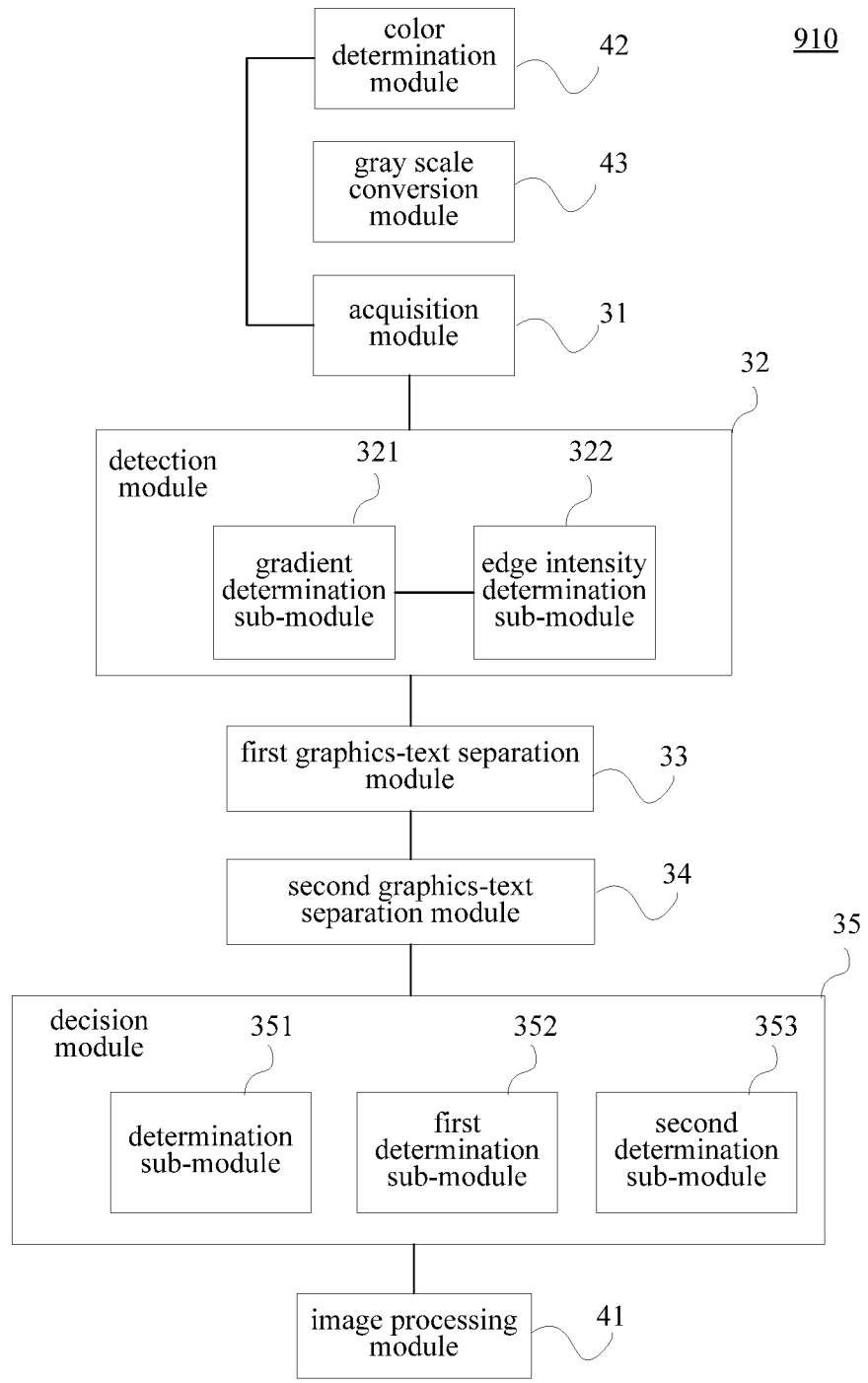
FIG. 10 illustrates a schematic view of another exemplary IPB text separation device consistent with disclosed embodiments.

FIG. 10 illustrates a schematic view of another exemplary IPB text separation device 910 consistent with disclosed embodiments. Similar aspects of the text separation device 900 in FIG. 9 and the text separation device 910 in FIG. 10 are not described again here, and certain differences are described. As shown in FIG. 10, in the text separation device 910, for printing in black-and-white, the detection module 32 includes a gradient determination sub-module 321 for determining gradient values of each pixel according to gray scale values of corresponding pixels, an edge intensity determination sub-module 322 for determining an edge intensity value of each pixel according to the gradient values of each pixel. In some embodiments, the corresponding pixels may include, for example, each pixel and a preset number of pixels adjacent to each pixel.

The gradient determination sub-module 321 may be configured to apply a gradient operator of a first detection filter and a gradient operator of a second detection filter to gray scale values of corresponding pixels for calculation for each pixel, such that an inter-row gradient value and an inter-column gradient value may be determined for each pixel.

The inter-row gradient value of each pixel may be $$\text{Gradient\_a}(i, j) = \sum_{p=-n, q=-n}^{n,n} (a(p, q) * \text{Gray}(i+p, j+q)).$$

The inter-column gradient value of each pixel may be $$\text{Gradient\_b}(i, j) = \sum_{p=-n, q=-n}^{n,n} (b(p, q) * \text{Gray}(i+p, j+q)).$$

$i \in [1, M]$, $j \in [1, N]$, i, j, M, N, and n may be positive integers. M may be a width of the TBP image, and N may be a height of the TBP image. Gray(i+p, j+q) may be a gray scale value for a pixel (i+p,j+q). Further, a(p,q) may be a value of a (2n+1)*(2n+1) template of the gradient operator of the first detection filter, and b(p,q) may be a value of a (2n+1)*(2n+1) template of the gradient operator of the second detection filter. Further, p∈[−n,n], q∈[−n,n], p and q may be integers, and n may be less than N and M.

The edge intensity determination sub-module 322 may be configured to determine the edge intensity value of each pixel according to the inter-row gradient value and the inter-column gradient value of each pixel, for each pixel.

The edge intensity value of each pixel may be strength $(i,j)=(abs(Gradient\_a(i,j))+abs(Gradient\_b(i,j)))/2$, where Gradient_a(i,j) may be the inter-row gradient value of the pixel, Gradient_b(i,j) may be the inter-column gradient value of the pixel, and abs may represent an absolute value.

The first graphics-text separation module 33 may be configured to: determine whether the edge intensity value of the current pixel is greater than a first segmentation threshold, for each pixel; determine that the current pixel is a text-edge region and determine that a value of the current pixel in the binary image is bw(i,j)=255 if the edge intensity value of the current pixel is greater than the first segmentation threshold, for each pixel; and determine that the current pixel is a non-text-edge region and determine that a value of the current pixel in the binary graph is bw(i,j)=0 if the edge intensity value of the current pixel is less than or equal to the first segmentation threshold, for each pixel.

The second graphics-text separation module 34 may be configured to determine the text region determination value of the current pixel, according to the gray scale value of the current pixel and corresponding values in the binary image for a preset quantity of pixels adjacent to the current pixel, for each pixel.

The text region determination value may be $$\text{Region}(i, j) = \left( \sum_{r=-n,t=-n}^{n,n} bw(i+r, j+t) \right) - bw(i, j) - ((2*n+1)^2 - 1) * \text{Gray}(i, j).$$

where Gray(i,j) may be a gray scale value of a pixel (i,j), $i \in [1,M]$, $j \in [1, N]$, and i, j, M, N, and n may be positive integers. M may be a width of the TBP image, and N may be a height of the TBP image. Further, bw(i+r,j+t) may be a corresponding value in the binary image for a pixel adjacent to the pixel (i,j) in a (2n+1)*(2n+1) template, $r \in [-n,n]$, $t \in [-n,n]$, r and t may be integers, and n may be less than N and M.

As shown in FIG. 10, the decision module 35 includes a determination sub-module 351 configured to determine whether the text region determination value of the current pixel is greater than the second segmentation threshold for each pixel; a first determination sub-module 352 configured to determine that the current pixel is a text-body region if it is determined that the text region determination value of the current pixel is greater than the second segmentation threshold, for each pixel; and a second determination sub-module 353 configured to determine that the current pixel is a non-text-body region if it is determined that the text region determination value of the current pixel is less than or equal to the second segmentation threshold, for each pixel.

The first determining sub-module 352 may be further configured to generate an index value index(i,j)=1 for the pixel identified as a text-body region, after it is determined that the current pixel is a text-body region.

The second determination sub-module 353 may be further configured to generate an index value index(i,j)=0 for the pixel identified as a non-text-body region, after it is determined that the current pixel is a non-text-body region.

The disclosed text separation device further includes an image processing module 41 configured to blacken each pixel in text-body regions in the TBP image, such that printout contents in black-and-white corresponding to the text-body regions in the TBP image are clear, after the decision module 35 determines text-body regions and non-text-body regions in the TBP image according to the text region determination value of each pixel; or an image processing module 41 configured to apply a sharpening process on each pixel in text-body regions in the TBP image, such that printout contents in black-and-white corresponding to the text-body regions in the TBP image are clear, and to apply a smoothing process on each pixel in non-text-body regions in the TBP image, such that moire fringes can be suppressed in printout contents in black-and-white corresponding to the non-text-body regions in the TBP image, after the decision module 35 determines text-body regions and non-text-body regions in the TBP image according to the text region determination value of each pixel.

As shown in FIG. 10, the disclosed text separation device further includes a color determination module 42, and a gray scale conversion module 43.

The color determination module 42 may be configured to obtain the TBP image and determine whether the TBP image is a color image or a gray scale image, before the acquisition module 31 obtains the gray scale value of each pixel in the TBP image.

The gray scale conversion module 43 may be configured to perform a gray scale conversion on the TBP image and thus to generate a gray scale image for the TBP image, if the color determination module 42 determines that the TBP image is a color image.

If the color determination module 42 determines that the TBP image is a gray scale image, the TBP image may be directly outputted to the acquisition module 31.

In various embodiments, the gray scale conversion module 43 may be configured to perform a gray scale conversion on each pixel of the TBP image and thus to generate a gray scale image corresponding to the TBP image, according to a gray scale conversion formula Gray(i,j)=a*R(i,j)+b*G(i,j)+c*B(i,j), if the color determination module 42 determines that the TBP image is a color image, where Gray(i,j) may be a gray scale value of a pixel (i,j), R(i,j) may be a red color component of the pixel (i,j), G(i,j) may be a green color component of the pixel (i,j), and B(i,j) may be a blue color component of the pixel (i,j). Further, a, b, and c may be preset product factors of the red color component, the green color component, and the blue color component, respectively. $i \in [1,M]$, $j \in [1, N]$, i, j, M, and N may be positive integers, M may be a width of the TBP image, and N may be a height of the TBP image.

In various embodiments, the color determination module 42 may be configured to detect whether the TBP image has three color channels or have gray scale data; and determine that the TBP image is a color image, if it is determined that the TBP image has three color channels, and determine that the TBP image is a gray scale image, if it is determined that the TBP image has gray scale data.

The disclosed IPB text separation device can perform the IPB text separation method of the disclosure, such as the IPB text separation method 200 in FIG. 2. The same or similar implementation principles are not described again here.

In the disclosed IPB text separation device, whether a TBP image is a color image or a gray scale image may be determined, and a color image may be converted into a gray scale image. A gray scale value of each pixel in the TBP image may be obtained. An edge intensity value of each pixel may be obtained according to gray scale values of corresponding pixels. A binary image corresponding to the TBP image may be determined according to the edge intensity values of each pixel. A text region determination value of each pixel may be obtained according to the binary image and the gray scale value of each pixel. Text-body regions and non-text-body regions in the TBP image may be determined according to the text region determination value of each pixel.

A print preprocessing may be performed on text-body regions in the TBP image and non-text-body regions in the TBP image, such that printout contents in black-and-white for the TBP image may be clear. Accordingly, the text-body regions in the TBP image and the non-text-body regions in the TBP image may be processed separately to enhance the respective regions. A blackening process, or sharpening may be performed on each pixel in the text-body regions. Thus, pixels of text-body regions may be recognized, and applied with a blackening process, or sharpening, when the image file is printed in black-and-white. As a result, blur printouts may be prevented during printing or copying in black-and-white for text-body regions including gray scale text-body regions and color text-body regions, and the clarity may be improved for printing and copying. Further, a smoothing process may be performed on each pixel of the non-text-body regions, such that moire fringes can be suppressed as compared to the conventional technology, and the clarity and a performance of copying can be improved in contents of black-and-white copying corresponding to the non-text-body regions in the TBP image.

In the case of a color printing, when the color determination module 42 determines that the TBP image is a color image, the three color components of the color image may be processed by the text separation device, separately.

The acquisition module 31 may acquire the pixel value of each pixel in the TBP image, where the pixel value may be one from the three color components of the pixel, or other appropriate value of the pixel.

The gradient determination sub-module 321 may be configured to determine gradient values for each pixel according to pixel values of corresponding pixels. In some embodiments, the corresponding pixels may include, for example, each pixel and a preset number of pixels adjacent to each pixel.

The edge intensity determination sub-module 322 may be configured to determine an edge intensity value of each pixel according to the gradient values of each pixel.

The first graphics-text separation module 33 may perform a process the same as or similar to a black-and-white printing.

The second graphics-text separation module 34 may determine a text region determination value of the current pixel according to the pixel value of the current pixel and corresponding values in the binary image for a preset quantity of pixels adjacent to the current pixel, for each pixel.

The decision module 35 may identify text-body regions and non-text-body regions of each color component, in the TBP image.

The image processing module 41 may process the respective regions separately, blacken the text-body regions or sharpen the text-body regions, and smooth the non-text-body regions, so as to enhance each region and realize a clear printout of the color printing.

Figure 11:
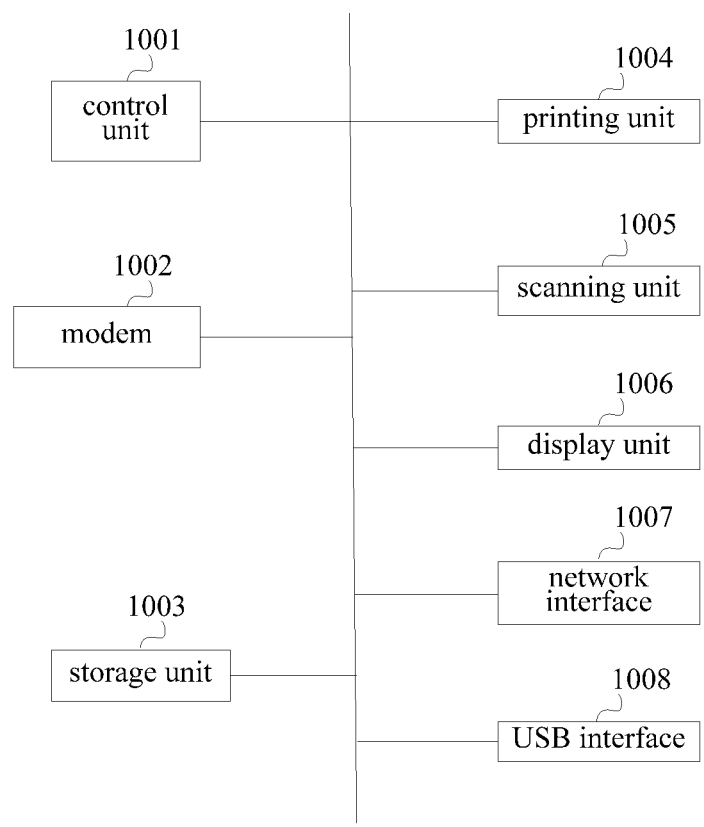
FIG. 11 illustrates a schematic view of an exemplary IPB image formation apparatus consistent with disclosed embodiments.

FIG. 11 illustrates a schematic view of an exemplary IPB image formation apparatus consistent with disclosed embodiments. As shown in FIG. 11, the image formation apparatus is provided with an IPB text separation device of the disclosure. The IPB image formation apparatus includes a control unit 1001, a modem 1002, a storage unit 1003, a printing unit 1004, a scanning unit 1005, a display unit 1006, a network interface 1007, and a universal serial bus (USB) interface 1008. The modem 1002 can allow the IPB image formation apparatus to communicate with a remote computer apparatus. The control unit 1001 can be, for example, a microprocessor. The storage unit 1003 can be, for example, a hard disk drive. The printing unit 1004 can be, for example, a printer. The scanning unit 1005 can be, for example, a scanner. The display unit 1006 can be, for example, a touch display screen. The network interface 1007 can be, for example, a network interface card. The USB interface 1008 can be, for example, a USB port.

The printing unit 1004 may be configured to print an output document. The scanning unit 1005 may be configured to copy a document and store a scanned TBP image in the storage unit 1003. The storage unit 1003 may store a program of the IPB text separation device. The program of the IPB text separation device can be executed by the control unit 1001, such that the control unit 1001 may process the scanned TBP image and perform a graphics-text separation process on the scanned TBP image, and may have the processed image stored in the storage unit 1003. The display unit 1006 may be configured to acquire a user's operation instructions and display the scanned TBP image or the processed image. The network interface 1007 may allow the IPB image formation apparatus to communicate with a computer in the network. The USB interface 1008 may be configured to allow the IPB image formation apparatus to communicate with an external computer via a USB cable.

The control unit 1001 may control the operation of the entire IPB image formation apparatus. The IPB image forming apparatus may receive a print job from the USB interface 1008 or the network interface 1007, and then output print data from the printing unit 1004. The control unit 1001 may receive a scan instruction of the user via the display unit 1006, acquire a scanned TBP image from the scanning unit 1005, process the scanned TBP image, and transmit the scanned TBP image to an external computer apparatus via the USB interface 1008 or the network interface 1007. Further, after processing the scanned TBP image, the control unit 1001 can print the processed image through the printing unit 1004 to output copies.

The IPB image formation apparatus may integrate scanning, copying, printing and other appropriate functions. The IPB image formation apparatus of the closure is not limited to facsimile machines, printers, scanners, copiers and multifunction machines. The IPB image formation apparatus of the present disclosure can include any appropriate functions according to various application scenarios, which is not limited in the present disclosure.

In various embodiments, in the IPB image formation apparatus, the IPB text separation device of the disclosure may be configured, for example, in the control unit 1001. The control unit 1001 can execute functions of the IPB text separation device consistent with the present disclosure. In various embodiments, by configuring the IPB text separation device of the disclosure in the IPB image formation apparatus, whether a TBP image is a color image or a gray scale image may be determined, and a color image may be converted into a gray scale image. A gray scale value of each pixel in the TBP image may be obtained. An edge intensity value of each pixel may be obtained according to gray scale values of corresponding pixels. A binary image corresponding to the TBP image may be determined according to the edge intensity value of each pixel. A text region determination value of each pixel may be obtained according to the binary image and the gray scale value of each pixel. Text-body regions and non-text-body regions in the TBP image may be determined according to the text region determination value of each pixel.

A print preprocessing may be performed on text-body regions in the TBP image and non-text-body regions in the TBP image, such that printout contents in black-and-white for the TBP image may be clear. Accordingly, the text-body regions in the TBP image and the non-text-body regions in the TBP image may be processed separately to enhance the respective regions. A blackening process, or sharpening processes may be performed on each pixel in the text-body regions. Accordingly, text-body regions may be recognized, and applied with a blackening process, or sharpening processes, when an image file is printed in black-and-white. As a result, blur printouts may be prevented for printing or copying in black-and-white for text-body regions including gray scale text-body regions and color text-body regions, and the clarity may be improved for printing and copying. Further, a smoothing process may be performed on each pixel of the non-text-body regions, such that moire fringes can be suppressed as compared to the conventional technology, and the clarity for copied contents corresponding to the non-text-body regions may be improved, and a performance of copying may be improved.

Further, when the image formation apparatus performs color printing, based on the IPB text separation device of the disclosure, three color components of the TBP image may be processed by the text separation device, separately. Accordingly, text-body regions and non-text-body regions of each color component in the TBP image can be processed separately, so as to enhance each region and realize a clear printout for the color printing.

The present disclosure provides an IPB text separation method, an IPB text separation device and an IPB image formation apparatus. The IPB text separation method may include: determining an edge intensity value of each pixel after obtaining a pixel value of each pixel in the TBP image; determining a binary image corresponding to the TBP image according to the edge intensity value of each pixel; determining a text region determination value of each pixel according to the binary image and the pixel value of each pixel; determining text content regions and non-text content regions in the TBP image after determining the text region determination value of each pixel; processing and enhancing the text content regions and the non-text content regions separately, such that blur text content regions may be prevented during printing or copying in black and white. Further, the text separation method, the text separation device and the text separation apparatus may suppress moire fringes that previously appear after halftone graphics regions are copied.

It will be understood by those of ordinary skill in the art that all or part of the steps of the various method embodiments described above may be accomplished by means of hardware associated with program instructions. The aforementioned programs may be stored in a computer-readable storage medium. When the program is executed, the steps of the method embodiments may also be executed. The aforementioned storage medium may include a read-only memory (ROM), a random access memory (RAM), a magnetic disk, a compact disk (CD), or any other appropriate storage medium that can store program codes.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A text separation method, comprising:
   obtaining a pixel value of each pixel in a to-be-processed image having a plurality of pixels;
   determining an edge intensity value of each pixel according to pixel values of each pixel and a preset number of pixels adjacent to each pixel;
   determining a binary image corresponding to the to-be-processed image according to the edge intensity value of each pixel;
   determining a text region determination value of each pixel according to a value in the binary image of the corresponding pixel and the pixel value of the corresponding pixel; and
   determining text-body regions and non-text-body regions in the to-be-processed image according to the text region determination value of each pixel.

2. The text separation method according to claim 1, wherein the determining of the edge intensity value of each pixel according to the pixel values of each pixel and the preset number of pixels adjacent to each pixel includes:
   applying a gradient operator of a first detection filter to the pixel values of each pixel and the preset number of pixels adjacent to each pixel for calculation for each pixel, such that an inter-row gradient value is determined for each pixel;
   applying a gradient operator of a second detection filter to the pixel values of each pixel and the preset number of pixels adjacent to each pixel for calculation for each pixel, such that an inter-column gradient value is determined for each pixel; and
   determining the edge intensity value of each pixel according to the inter-row gradient value and the inter-column gradient value of each pixel.

3. The text separation method according to claim 2, wherein:
   the inter-row gradient value of each pixel is $$\text{Gradient\_a}(i, j) = \sum_{p=-n, q=-n}^{n,n} (a(p, q) * P(i + p, j + q));$$

the inter-column gradient value of each pixel is $$\text{Gradient\_b}(i, j) = \sum_{p=-n, q=-n}^{n,n} (b(p, q) * P(i + p, j + q));$$

$i \in [1, M]$, $j \in [1, N]$, and i, j, M, N, and n are positive integers;
   M is a width of the to-be-processed image, and N is a height of the to-be-processed image;
   $P(i+p, j+q)$ is a pixel value for a pixel $(i+p, j+q)$;
   $a(p,q)$ is a value of a $(2n+1)*(2n+1)$ template of the gradient operator of the first detection filter;
   $b(p,q)$ is a value of a $(2n+1)*(2n+1)$ template of the gradient operator of the second detection filter;
   $p \in [-n, n]$, $q \in [-n, n]$, p and q are integers, and n is less than N and M; and the determining of the edge intensity value of each pixel according to the inter-row gradient value and the inter-column gradient value of each pixel includes determining the edge intensity value of each pixel according to a formula strength(i,j)=(abs(Gradient_a(i,j))+abs(Gradient_b(i,j)))/2, wherein abs represents an absolute value.

4. The text separation method according to claim 1, wherein the determining of the text region determination value of each pixel according to the binary image and the pixel value of each pixel includes:
for each pixel, determining a text region determination value of a current pixel according to a pixel value of the current pixel and values in the binary image for a preset quantity of pixels adjacent to the current pixel.

5. The text separation method according to claim 4, wherein:
the text region determination value is $$\text{Region}(i, j) = \left(\sum_{r=-n, t=-n}^{n,n} bw(i+r, j+t)\right) - bw(i, j) - ((2*n+1)^2 - 1) * P(i, j);$$

P(i,j) is a pixel value of a pixel (i,j);
i∈[1,M], j∈[1, N], and i, j, M, N, and n are positive integers;
M is a width of the to-be-processed image, and N is a height of the to-be-processed image;
bw(i+r,j+t) is a value in the binary image for a pixel adjacent to a pixel (i,j) in a (2n+1)*(2n+1) template;
r∈[−n,n], t E [−n,n], r and t are integers, and n is less than N and M.

6. The text separation method according to claim 1, after the determining of the text-body regions and the non-text-body regions in the to-be-processed image according to the text region determination value of each pixel, the method further comprising:
applying a blackening process to each pixel in the text-body regions in the to-be-processed image, such that printout contents corresponding to the text-body regions in the to-be-processed image are clear; and
applying a smoothing process to each pixel in the non-text-body regions in the to-be-processed image, such that moire fringes are suppressed in printout contents corresponding to the non-text-body regions in the to-be-processed image.

7. The text separation method according to claim 1, after determining the text-body regions and the non-text-body regions in the to-be-processed image according to the text region determination value of each pixel, the method further comprising:
applying a sharpening process to each pixel in the text-body regions in the to-be-processed image, such that printout contents corresponding to the text-body regions in the to-be-processed image are clear; and
applying a smoothing process to each pixel in the non-text-body regions in the to-be-processed image, such that moire fringes are suppressed in printout contents corresponding to the non-text-body regions in the to-be-processed image.

8. The text separation method according to claim 1, comprising:
repeating a first-part segmentation process and a second-part segmentation process until the text-body regions and the non-text-body regions in the to-be-processed image are determined, wherein:
the first-part segmentation process includes repeating a process until values in the binary image for a preset quantity of pixels are determined, the process including:
obtaining pixel values of the preset quantity of pixels in the to-be-processed image;
determining an edge intensity value of a current pixel according to pixel values of the current pixel and a preset number of pixels adjacent to the current pixel, for each of the preset quantity of pixels; and
determining a value of the current pixel in the binary image corresponding to the to-be-processed image according to the edge intensity value of the current pixel, for each of the preset quantity of pixels, and
the second-part segmentation process includes repeating a process until it is determined that the preset quantity of pixels are text-body regions or non-text-body regions, the process including:
determining a text region determination value of the current pixel according to values in the binary image for pixels adjacent to the current pixel and a pixel value of the current pixel, for each of the preset quantity of pixels; and
determining that the current pixel is a text-body region or a non-text-body region according to the text region determination value of the current pixel, for each of the preset quantity of pixels.

9. A text separation method, comprising:
obtaining a pixel value of each pixel in a to-be-processed image having a plurality of pixels;
determining an edge intensity value of each pixel according to pixel values of each pixel and a preset number of pixels adjacent to each pixel;
determining a binary image corresponding to the to-be-processed image according to the edge intensity value of each pixel;
determining a text region determination value of each pixel according to a value in the binary image of the corresponding pixel and the pixel value of the corresponding pixel; and
determining text-body regions and non-text-body regions in the to-be-processed image according to the text region determination value of each pixel, wherein the determining of the text-body regions and the non-text-body regions in the to-be-processed image according to the text region determination value of each pixel includes:
for each pixel, determining whether a text region determination value of a current pixel is greater than a second segmentation threshold;
for each pixel, determining that the current pixel is a text-body region, if it is determined that the text region determination value of the current pixel is greater than the second segmentation threshold; and
for each pixel, determining that the current pixel is a non-text-body region, if it is determined that the text region determination value of the current pixel is less than or equal to the second segmentation threshold.

10. A text separation device, comprising:
a memory storing instructions; and
a processor coupled to the memory and, when executing the instructions, configured to:
obtain a pixel value of each pixel in a to-be-processed image having a plurality of pixels;

determine an edge intensity value of each pixel according to pixel values of each pixel and a preset number of pixels adjacent to each pixel;

determine a binary image corresponding to the to-be-processed image according to the edge intensity value of each pixel;

determine a text region determination value of each pixel according to a value in the binary image of the corresponding pixel and the pixel value of the corresponding pixel; and determine text-body regions and non-text-body regions in the to-be-processed image according to the text region determination value of each pixel.

11. The text separation device according to claim 10, wherein the processor is further configured to:

apply a gradient operator of a first detection filter and a gradient operator of a second detection filter to pixel values of each pixel and the preset number of pixels adjacent to each pixel for calculation for each pixel, such that an inter-row gradient value and an inter-column gradient value are determined for each pixel, and determine the edge intensity value of each pixel according to the inter-row gradient value and the inter-column gradient value of each pixel.

12. The text separation device according to claim 11, wherein:

the inter-row gradient value of each pixel is $$\text{Gradient\_a}(i, j) = \sum_{p=-n,q=-n}^{n,n} (a(p, q) * P(i + p, j + q));$$

the inter-column gradient value of each pixel is $$\text{Gradient\_b}(i, j) = \sum_{p=-n,q=-n}^{n,n} (b(p, q) * P(i + p, j + q));$$

$i \in [1,M]$, $j \in [1,N]$, and i, j, M, N, and n are positive integers;

M is a width of the to-be-processed image, and N is a height of the to-be-processed image;

P(i+p,j+q) is a pixel value for a pixel (i+p,j+q);

a(p,q) is a value of a (2n+1)*(2n+1) template of the gradient operator of the first detection filter;

b(p,q) is a value of a (2n+1)*(2n+1) template of the gradient operator of the second detection filter;

$p \in [-n,n]$, $q \in [-n,n]$, p and q are integers, and n is less than N and M; and the processor is configured to calculate the edge intensity value of each pixel according to a formula strength(i, j)=(abs(Gradient_a(i,j))+abs(Gradient_b(i,j)))/2, wherein abs represents an absolute value.

13. The text separation device according to claim 10, wherein the processor is further configured to:

determine a text region determination value of a current pixel according to a pixel value of the current pixel and values in the binary image for a preset quantity of pixels adjacent to the current pixel, for each pixel.

14. The text separation device according to claim 13, wherein:

the text region determination value is $$\text{Region}(i, j) = \left( \sum_{r=-n,t=-n}^{n,n} bw(i+r, j+t) \right) - bw(i, j) - ((2*n+1)^2 - 1) * P(i, j);$$

P (i,j) is a pixel value of a pixel (i,j);

$i \in [1,M]$, $j \in [1, N]$, and i, j, M, N, and n are positive integers;

M is a width of the to-be-processed image, and N is a height of the to-be-processed image;

bw(i+r,j+t) is a value in the binary image for a pixel adjacent to a pixel (i,j) in a (2n+1)*(2n+1) template; and $r \in [-n,n]$, $t \in [-n,n]$, r and t are integers, and n is less than N and M.

15. The text separation device according to claim 10, wherein the processor is further configured to:

determine whether a text region determination value of a current pixel is greater than a second determination threshold, for each pixel;

determine that the current pixel is a text-body region, if it is determined that the text region determination value of the current pixel is greater than the second segmentation threshold, for each pixel; and determine that the current pixel is a non-text-body region, if it is determined that the text region determination value of the current pixel is less than or equal to the second segmentation threshold, for each pixel.

16. The text separation device according to claim 10, wherein the processor is further configured to:

blacken or sharpen each pixel in the text-body regions in the to-be-processed image, such that printout contents corresponding to the text-body regions in the to-be-processed image are clear, after text-body regions and non-text-body regions in the to-be-processed image are determined according to the text region determination value of each pixel; and apply a smoothing process to each pixel in the non-text-body regions in the to-be-processed image, such that moire fringes are suppressed in printout contents corresponding to the non-text-body regions in the to-be-processed image, after text-body regions and non-text-body regions in the to-be-processed image are determined according to the text region determination value of each pixel.

17. The text separation device according to claim 10, configured to:

repeat a first-part segmentation process and a second-part segmentation process until the text-body regions and the non-text-body regions in the to-be-processed image are determined, wherein:

the first-part segmentation process includes repeating a process until values in the binary image for a preset quantity of pixels are determined, wherein the process includes:

obtaining pixel values of the preset quantity of pixels in the to-be-processed image;

determining an edge intensity value of a current pixel according to pixel values of the current pixel and a preset number of pixels adjacent to the current pixel, for each of the preset quantity of pixels; and determining a value of the current pixel in the binary image corresponding to the to-be-processed image, according to the edge intensity value of the current pixel, for each of the preset quantity of pixels, and the second-part segmentation process includes repeating a process until it is determined that the preset quantity of pixels are text-body regions or non-text-body regions, wherein the process includes:

determining a text region determination value of the current pixel according to values in the binary image for pixels adjacent to the current pixel and a pixel value of the current pixel, for each of the preset quantity of pixels; and determining that the current pixel is a text-body region or a non-text-body region according to the text region determination value of the current pixel, for each of the preset quantity of pixels.

18. An image formation apparatus, comprising the text separation device according to claim 10.

* * * * *